US 8,405,574 B1

(12) United States Patent
Gallahger et al.

(10) Patent No.: US 8,405,574 B1
(45) Date of Patent: Mar. 26, 2013

(54) FACEMASK DISPLAY (75) Inventors: Dennis G. Gallahger, Panama City, FL (US); William D. Olstad, Panama City, FL (US); William W. Hughes, III, Panama City, FL (US); Charles G. Holmes, Panama City, FL (US); Richard Manley, Panama City, FL (US); Charles M. Edmondson, II, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 439 days.

(21) Appl. No.: 12/806,258

(22) Filed: Jul. 30, 2010

(51) Int. Cl.
 *G09G 3/00* (2006.01)
(52) U.S. Cl. .......................................................... 345/8
(58) Field of Classification Search .................. None
 See application file for complete search history.

(56) References Cited

U.S. PATENT DOCUMENTS

| 2008/0088529 A1* | 4/2008 | Tang .................................. 345/8 |
| 2008/0143639 A1* | 6/2008 | Gerbe et al. ...................... 345/8 |
| 2009/0153437 A1* | 6/2009 | Aharoni ............................ 345/8 |

* cited by examiner

*Primary Examiner* — Joseph Haley
(74) *Attorney, Agent, or Firm* — James T. Shepherd (57) ABSTRACT

Systems and methods for a facemask wearer to view high resolution, high data content, color imagery are provided. A display using organic light emitting diode (OLED) micro-displays provides 800×600 color pixel resolution at 60 Hz. The OLED micro-displays allow for powering the system through a standard Universal Serial Bus (USB) port connected to a compatible sensor system that provides the required power and standard display signal to the OLED display. The display is held away from the user's field of view by a quick release facemask attachment bracket. The bracket can provide for flipping the display up and down, swiveling the display, or rotating the display with one hand. When needed, the display can be flipped down, such that the display is in contact with the facemask faceplate, enabling clear, focused images even in zero visibility water.

22 Claims, 6 Drawing Sheets

FIG. 6

FACEMASK DISPLAY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to displays for facemasks. More particularly, the present invention relates to head-mounted displays worn by divers, firefighters, or the like.

(2) Description of the Prior Art

Divers, firefighters, first responders and other workers that wear facemasks frequently need to be apprised of environmental and status information for the successful and safe completion of their work assignments. Such information can include details of their surroundings, environmental and ambient conditions, and data regarding depth, orientation, or status of their life-support breathing apparatus.

Typically, this information has been provided by visual display screens. These display screens are generally integrated "displays-on-board" (IDOB) systems built directly into the sensor equipment, or remote head- or mask-mounted display systems attached to the sensor device via a cable. Both of the systems in use to date have significant shortfalls.

IDOB systems include flat panel or cathode ray tube screens built directly into the equipment or sensor held by the facemask wearer for displaying the data content of the equipment or sensor in a high-resolution format. However, such displays generally require a large amount of power, greatly limiting their use with the portable battery powered systems used in the aforementioned work environments.

Additionally, even small flat panel display screens have a minimum viewing distance of approximately 10-inches. At this distance, the screens may not be clearly visible when viewed in highly turbid or poor visibility environments, where the visibility may be in the range of one to two inches at best. Even in relatively clear conditions, the physical size and brightness levels required for viewing are a tactical hindrance for military operations requiring low probability of detection, such as clandestine or covert night missions.

Commercial off-the-shelf (COTS) head-mounted displays (HMDs) are available. However, the known displays typically require bulky interpupillary adjustment mechanisms for each individual user, and/or they have eye relief distances in the range of 25 mm. These features make them unsatisfactory for use with a facemask, since the entire display may not be seen.

Additionally, COTS HMDs generally use low resolution displays (on the order of 320×240 pixels, or 640×480 pixels), significantly reducing image quality and effectiveness. Also, a number of such systems have bulky mask attachment mechanisms and/or large mechanical housings making them extremely difficult to use and possibly causing a safety hazard.

Thus, a need has been recognized in the state of the art to provide systems for a facemask wearer to view high resolution, high data content, color imagery from a number of sensor devices. Further, a need exists to provide this imagery to the wearer regardless of ambient visibility conditions, and without requiring bulky optical adjustment mechanisms that may subject the facemask to leakage.

SUMMARY OF THE INVENTION

It is therefore a general purpose and primary object of the present invention to provide systems and methods for a facemask wearer to view high resolution, high data content color imagery from a number of sensor devices. A display having organic light emitting diode (OLED) matrix micro-displays provides 800×600 color pixel resolution at 60 Hz.

The display has a waterproof housing, cable and connector assembly for underwater use. The housing materials and design can be chosen to provide specific depth ratings for the system. The low power usage of the OLED display allows the system to be powered through a standard Universal Serial Bus (USB) port. The display can be plugged into a compatible sensor system that provides the required power and standard display signal to the display.

A binocular embodiment includes cylindrical lens arrays spaced at 62.5 mm to project a virtual image with a horizontal field of view (HFOV) of 32°. A single, readily accessible, centrally located brightness control allows the user to adjust the system brightness for daylight, nighttime, or tactical situation operations.

Using a facemask attachment bracket with a clevis mechanism, the display can be attached to the facemask away from the user's field of view. The clevis mechanism can provide for flipping the display up and down, swiveling the display, or rotating the display with one hand using a friction design known in the art. When needed, the display can be flipped down, such that the display is in contact with the facemask faceplate, enabling clear, focused images even in zero visibility water.

The facemask attachment bracket includes a U-shaped frame extending along top and side portions of the facemask. The top and side portions of the frame are shaped to correspond with the top and side portions of the facemask. Removable attachment clips, tailored for the specific facemask, secure the frame to the facemask. The clevis mechanism includes a quick release mechanism that interconnects the U-shaped frame and the display.

Two cylindrical holding pins are spaced apart and affixed at the top portion of the frame. The pins extend orthogonally from the top portion of the frame away from the facemask and have a circumferential radiused groove at a distance from the facemask. The ends of the pins distant from the facemask have a frusto-conical shape.

The pins mate with bores in leg portions of the clevis mechanism. A spring-loaded bar spans between the leg portions, transverse to the axis of the bores. The ends of the bar are contained within slots parallel to the bar. The slots extend into the leg portions to intersect the bores, with the base of the slots being offset from the bore axis. The spring biases the bar against the base of the slot, such that the bar partially extends into the bore.

As the clevis mechanism is moved toward the frame, the pins extend into the bores and the ends of the pins displace the bar from the bore. Continuing to move the clevis mechanism toward the frame results in the pins further advancing into the bores until the spring-bias causes the bar to engage with the grooves on the pins so as to secure the clevis mechanism to the frame.

A lever is rotatably attached between the leg portions of the clevis mechanism. When pivoted about an axis parallel to the bar axis, the lever contacts the bar and works against the spring-bias to lift the bar out of the pin grooves. With the bar disengaged from the grooves, the clevis mechanism can be moved away from the frame to retract the pins from the bores and disengage the clevis mechanism from the frame.

In one embodiment, a display for a user of a facemask to view data from a sensor includes two viewing lenses spaced apart so as to provide a user with a horizontal field of view of between 31° and 33°. Two organic light emitting diode matrices are positioned along the same axes as the viewing lenses and spaced a distance apart from the viewing lenses. Two lens arrays are positioned along the axes between said viewing lenses and said matrices. The lens arrays have an offset from the axes so as to project images from the matrices onto the viewing lenses at an angle from the axes. The angle corresponds to an image convergence angle for over 90% of a user population.

The display includes a housing, which encloses the matrices and the arrays and secures the viewing lenses. The housing protects components of the display contained within the housing from environments surrounding the housing. A Universal Serial Bus connector extends from said housing, the connector transmits power and the data from the sensor to the display. A control is positioned on the exterior of the housing and accessible to the user. The control is in communication with the matrices to control the brightness of the images.

In one embodiment, an index bracket assembly is secured to the facemask and a clevis attachment is affixed to the housing and to the index bracket assembly. The index bracket assembly includes a U-shaped frame with top and side portions consistent in shape with top and side rim portions of the facemask. At least one clip is secured to the frame and removably compresses at least one of the top or side rim portions between the frame and the clip. At least two holding pins are spaced apart and affixed to the frame. The pins extend orthogonally from the frame in a direction away from the facemask. A clevis mechanism has bores formed therein. Each of the pins is accepted into one of the bores and is releasably secured within the bore. The clevis attachment is secured to the clevis mechanism.

The clevis mechanism includes a base portion, which houses the bores. The base portion is positioned adjacent the frame when the pins are secured within the bores. Appendages extend orthogonally from the base portion and the bores extend through the base portion into the appendages.

A movable retaining bar is positioned transverse to and spans between the appendages and intersects the bores in the appendages. The retaining bar is spring-biased to reside at least partially in the bores. The ends of the pins displace the retaining bar from the bores. The bar engages the groove in each of the pins so as to secure the clevis mechanism to the frame.

A lever is pivotally attached between the appendages, with a first end of the lever in contact with the bar. Pivoting the lever about an axis parallel to the bar disengages the bar from the grooves. The clevis mechanism includes a bolt that extends through the appendages and secures the clevis attachment between the appendages. In one embodiment, the centerline axes of the viewing lenses and matrices are spaced apart a distance of 62.5 millimeters. In one embodiment, the offset is 2°.

In one embodiment, a display for a user of a facemask to view data from a sensor includes two viewing lenses having centerline axes spaced apart a distance that provides a user with a horizontal field of view of between 31° and 33°. In one embodiment the viewing lenses are spaced apart a distance of 62.5 millimeters.

Two organic light emitting diode matrices are spaced a distance along the axes from the viewing lenses and two lens arrays are positioned along the axes between the viewing lenses and the matrices. The arrays have an offset from the axes so as to project images from the matrices onto the viewing lenses at an angle from the axes. The angle corresponds to an image convergence angle for over 90% of a user population. In one embodiment, the angle is 2°.

A housing encloses the matrices and arrays and secures the viewing lenses. The housing protects components of the display contained within the housing from environments surrounding the housing. A U-shaped frame has top and side portions consistent in shape with top and side rim portions of the facemask. At least one clip is secured to the frame and removably compresses either one or both of the top and side rim portions between the frame and the clip.

At least two holding pins are spaced apart and affixed to the frame. The pins extend orthogonally from the frame in a direction away from the facemask. A clevis attachment is affixed to the housing. A clevis mechanism has bores formed therein. Each of the pins is accepted into one of the bores and is releasably secured within the bore. The clevis attachment is secured to the clevis mechanism.

A Universal Serial Bus connector extends from the housing and transmits power and data from a sensor to the display. A control knob is positioned on the exterior of the housing so as to be easily accessible to a user. The control knob is in communication with the matrices to control the brightness of the images from the matrices.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE INVENTION

Figure 1:
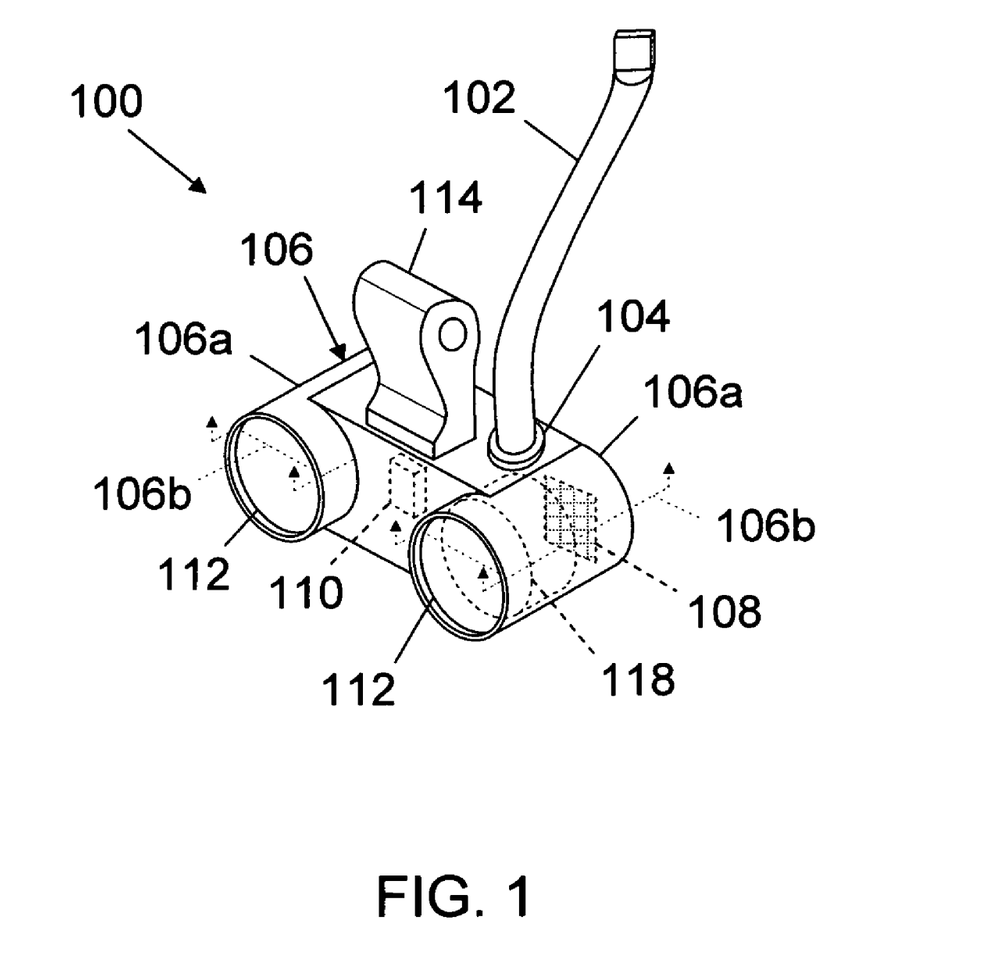
FIG. 1 illustrates a schematic side view of a facemask display.
Figure 2:
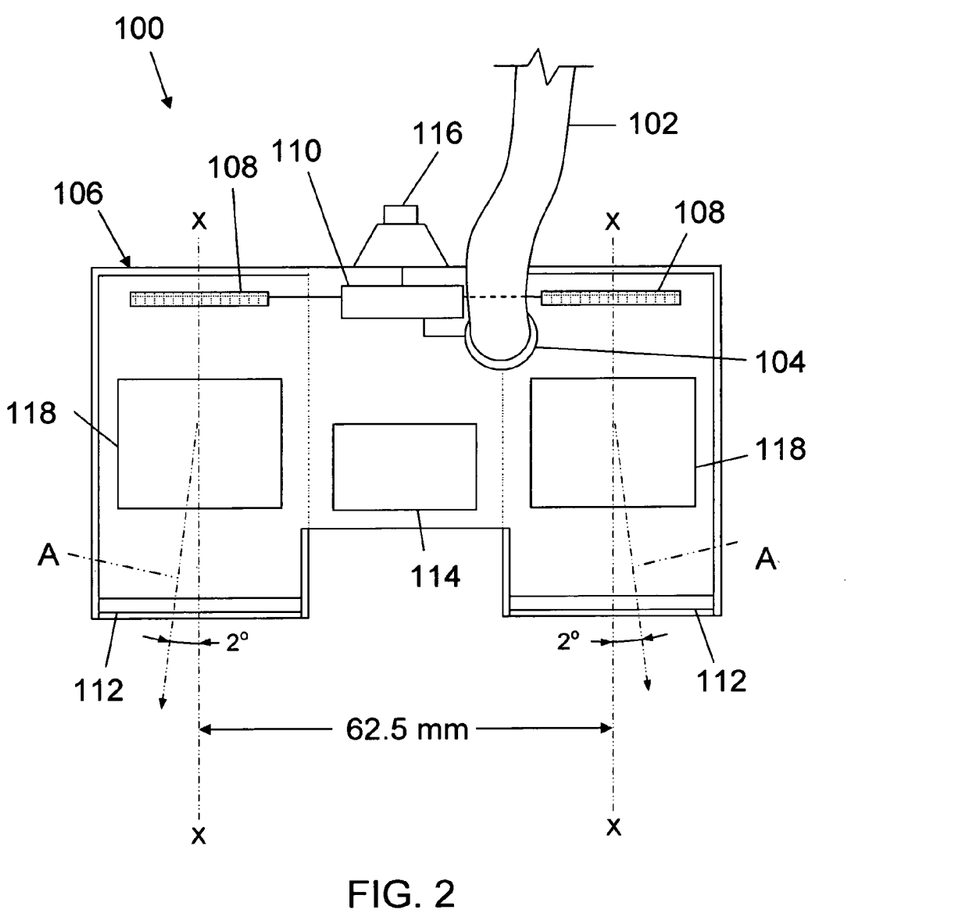
FIG. 2 illustrates a top view of a facemask display.

Referring now to FIG. 1 and FIG. 2, there are shown a schematic side view and a top view, respectively, of facemask display 100. Universal Serial Bus (USB) cable 102 connects display 100 to a compatible sensor system (not shown in FIGS. 1 and 2). Both power and the display signal to display 100 are provided through cable 102. In the description that follows, reference is made to the use of display 100 in an underwater environment. However, as would be readily apparent to those of skill in the art, the features described herein are equally applicable for use in other environments where a facemask is worn.

Junction 104 provides a waterproof seal for cable 102 to enter housing 106 of display 100. Housing 106 provides a waterproof enclosure for organic light emitting diode (OLED) matrices 108 (only one of which is shown in phantom in FIG. 1 for clarity) and electronics 110. Electronics 110 controls the output of matrices 108 in accordance with data received via cable 102.

Housing 106 further provides a waterproof seal for lenses 112. Both junction 104 and housing 106 utilize waterproofing materials and designs as are known to those of skill in the art. For illustrative purposes only in FIG. 2, and not for limitation, tops of cylindrical portions 106a of housing 106 are removed along dash-dot lines and arrows 106b in FIG. 1 to provide an unobstructed view of matrices 108, electronics 110 and other internal components of display 100 as will be described in detail hereinafter.

Display 100 is secured to a facemask using clevis attachment 114, in a manner known in the art. As will be described in further detail hereinafter, clevis attachment 114 provides for flipping display 100 up and down, swiveling display 100, or rotating display 100 with one hand using a friction design known in the art. Brightness control 116 (not visible in FIG. 1) is centrally positioned on display 100 to provide for ease of accessibility. Control 116 is in communication with electronics 110 such that operation of control 116 adjusts the brightness of OLED matrices 108 for daylight, nighttime, or tactical situation operations.

Referring more particularly to FIG. 2, there is shown a top view of display 100. OLED matrices 108 are positioned along centerlines (axes X-X) of cylindrical housing portions 106a of housing 106, distant from lenses 112. In the preferred embodiment, axes X-X are spaced apart a distance of 62.5 millimeters (mm). This projects a virtual image at lenses 112 with a horizontal field of view (HFOV) of 32°. OLED matrices 108 provide for a color pixel resolution in the range of 800×600 pixels at 60 Hertz (Hz), in a manner known for commercial off-the-shelf (COTS) OLEDs.

Cylindrical lens arrays 118 (only one of which is shown in phantom in FIG. 1 for clarity) are positioned along axes X-X, between matrices 108 and lenses 112. Arrays 118 are configured to project images from OLED matrices 108 (illustrated by arrows A in FIG. 2) at an offset of 2° from axes X-X, such that the center of the images (arrows A) are spaced farther apart than axes X-X at lenses 112.

The 2° offsets enable users with interpupillary distances of from 52 mm to 72 mm to converge and view the images at lenses 112 without the need for a mechanical adjustment apparatus. Approximately 93% of the population has an interpupillary distance in the above mentioned range.

Figure 3:
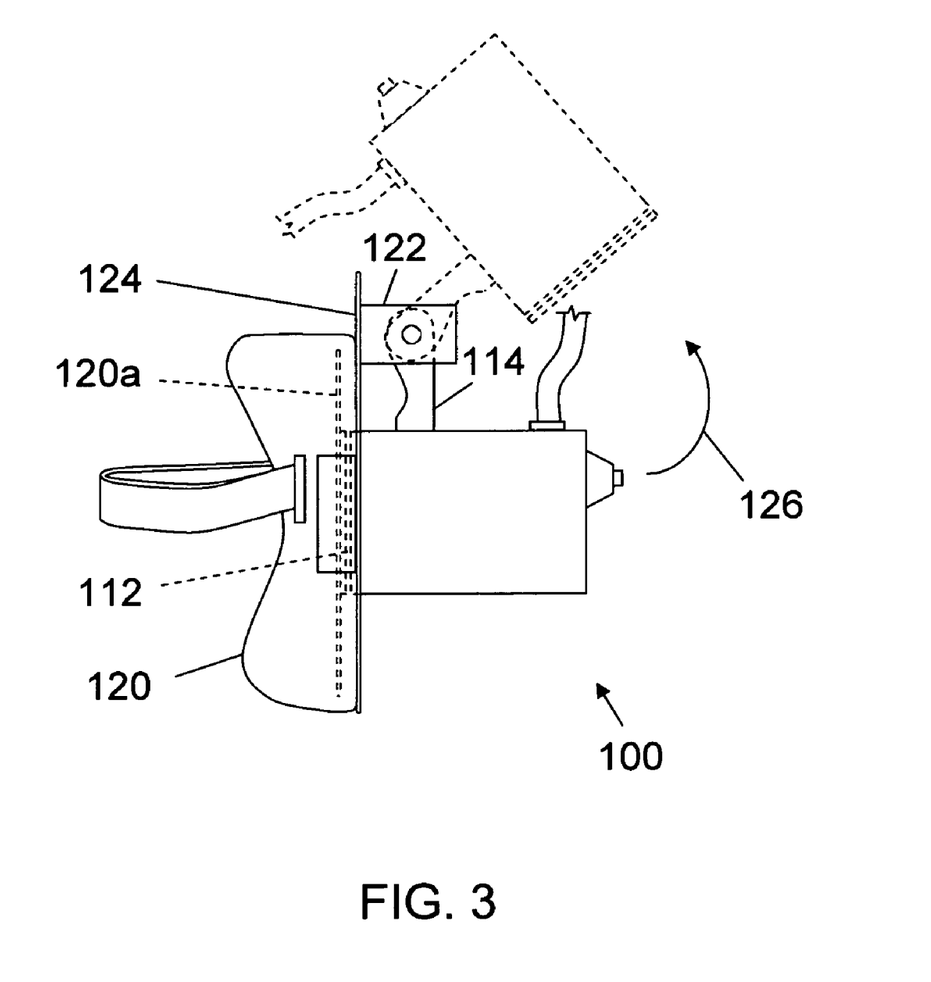
FIG. 3 illustrates a side view of a facemask display attached to a facemask.

Referring now to FIG. 3, there is shown a side view of display 100 in a viewing configuration. Lenses 112 are positioned adjacent facemask 120, and more particularly adjacent faceplate 120a of facemask 120. In this position, lenses 112 provide a 35 mm eye relief viewing distance, based on a standard underwater mask. The 35 mm eye relief viewing distance allows the user to easily see the entire display image through facemask 120, unlike the 25 mm eye relief viewing distance of current systems. With the 32° HFOV, the 35 mm eye relief viewing distance is the equivalent of viewing a 69" diagonal display at a distance of 10 feet.

To position display 100 against facemask 120, clevis attachment 114 is secured to clevis mechanism 122. In turn, clevis mechanism 122 is secured to index bracket assembly 124; and index bracket assembly 124 is secured to facemask 120, all as described in further detail hereinafter. Clevis attachment 114 provides for rotating display 100 away from facemask 120 (as indicated by arrow 126) to a stowed position (illustrated in phantom). In the stowed position, display 100 does not obstruct the user's vision.

Figure 4:
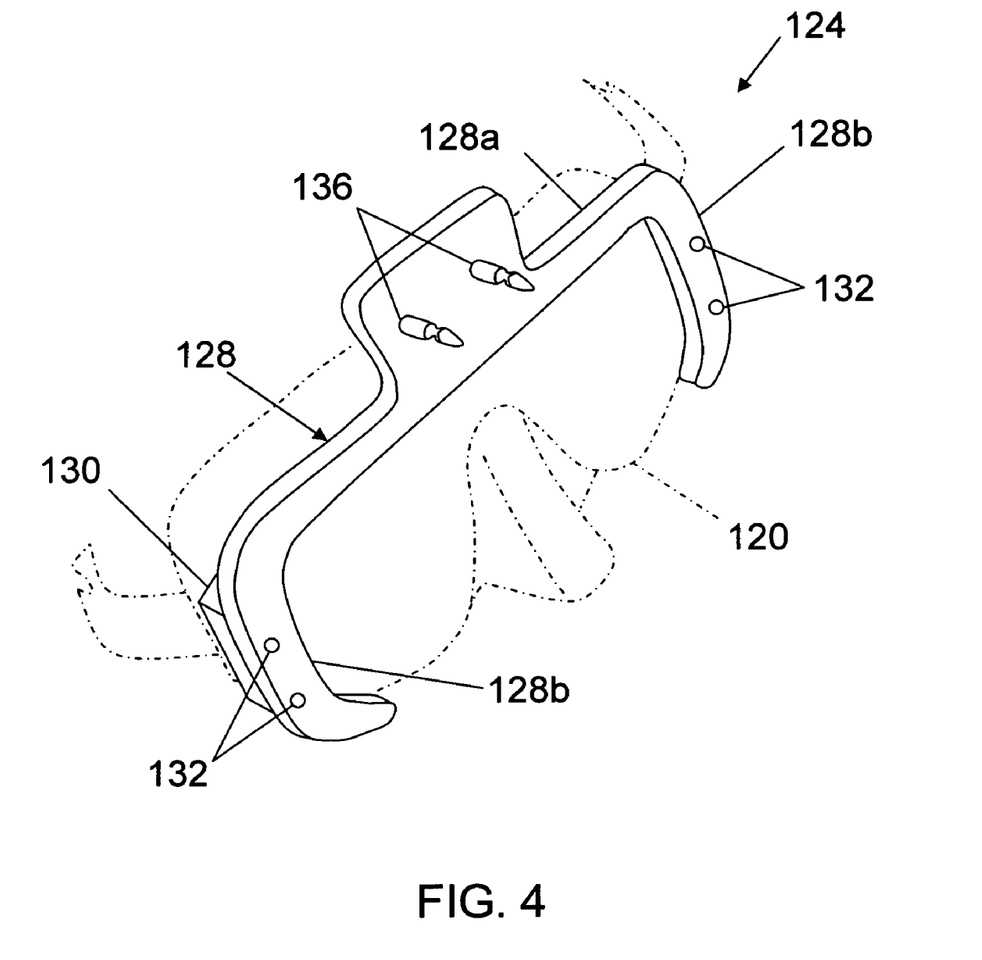
FIG. 4 illustrates a schematic side view of an index bracket assembly.

Referring now to FIG. 4, there is shown a schematic side view of index bracket assembly 124 attached to a representative SCUBA facemask 120 (shown in phantom in FIG. 4). It will be understood by those of skill in the art that the exact configuration of index bracket assembly 124 will depend on the specific facemask to which assembly 124 will be attached. However, the features of assembly 124 described hereinafter apply equally to a multitude of facemask configurations.

U-shaped frame 128 of assembly 124 has a top portion 128a and side portions, 128b, that generally conform to the shape of facemask 120. Frame 128 is configured such that, when pressed against facemask 120, the obstruction of the diver's view through facemask 120 is minimized.

Figure 5:
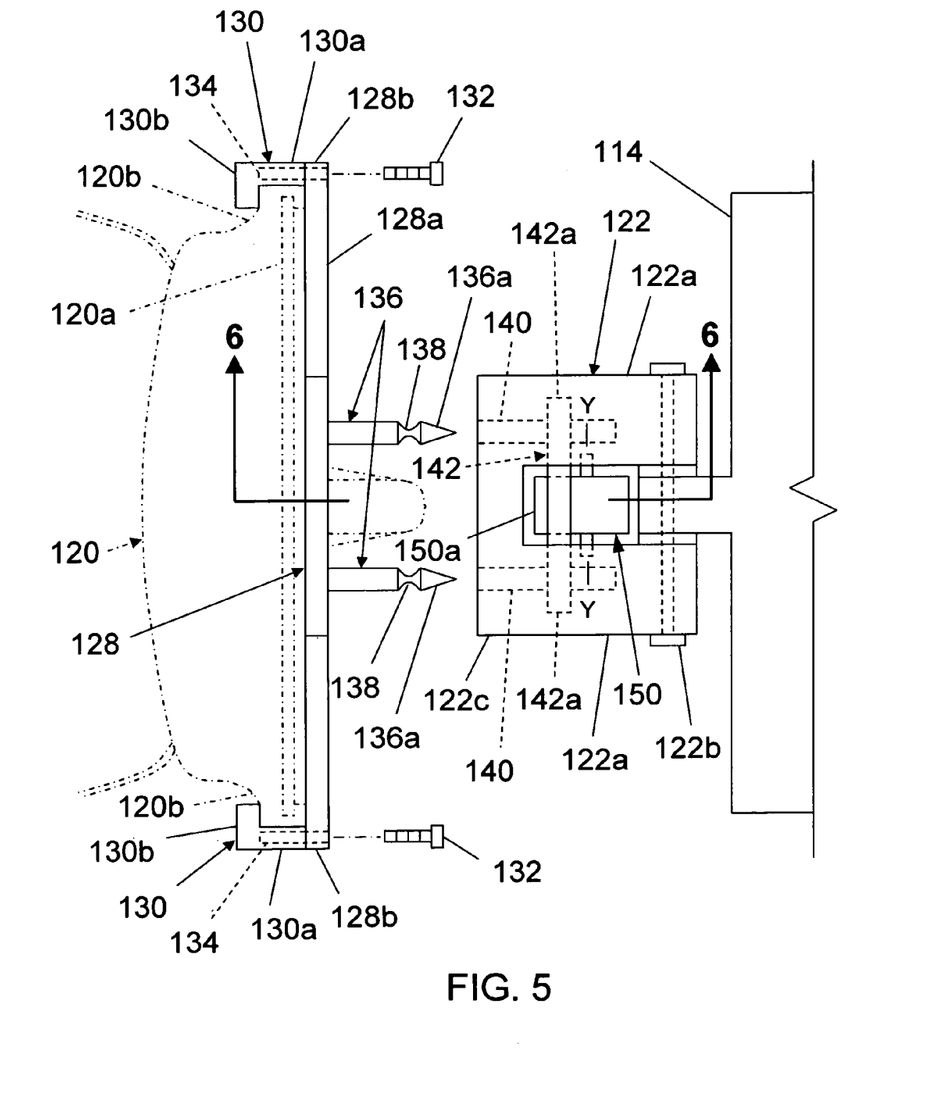
FIG. 5 illustrates a top view of an index bracket assembly and a clevis mechanism for securing a facemask display to the bracket assembly.

Referring also to FIG. 5, there is shown a top view of assembly 124 attached to mask 120. Clips 130 are removably attached to, and extend a distance along, leg portions 128b of frame 128 and secure frame 128 to facemask 120. For the exemplary embodiment illustrated in FIGS. 4 and 5, but not for limitation, clips 130 are L-shaped having first legs, 130a, orthogonal to frame 128 and second legs, 130b, distant from frame 128 and extending in a plane parallel to the plane of frame 128.

A width of leg portions 128b is such that leg portions 128b and first legs 130a of clips 130 extend beyond the perimeter of facemask 120. Bolts 132 extend through leg portions 128b and mate with threaded bores 134 in first legs 130a. As bolts 132 are tightened into threaded bores 134, second legs 130b are drawn towards frame 128 such that rim portions 120b of facemask 120, which secure faceplate 120a, are compressed between second legs 130b and frame leg portions 128b. In this manner, frame 128 is held securely against facemask 120.

It will be understood by those of skill in the art that the exact configuration of clips 130 will depend on the specific facemask 120 to which frame 128 is attached. In addition, the foregoing description is not intended to limit the manner in which clips 130 secure frame 128 to facemask 120. Additional examples by which clips 130 secure frame 128 include clips 130 being spring loaded clips, draw bolt latch clips, cam latch clips, or other clip designs known in the art.

Two cylindrical holding pins 136 are spaced apart and affixed at top portion 128a of frame 128. Pins 136 extend orthogonally from top portion 128a in a direction away from facemask 120. Circumferential radiused grooves 138 are formed in pins 136 at a distance from facemask 120. Ends 136a of pins 136 distant from facemask 120 have a frusto-conical shape.

Pins 136 mate with bores 140 in clevis mechanism 122 (not shown in FIG. 4 for clarity). Clevis attachment 114 is secured between clevis appendages 122a in a manner known in the art to provide for flipping clevis attachment 114 up and down, swiveling clevis attachment 114, or rotating clevis attachment 114 with one hand.

Figure 6:
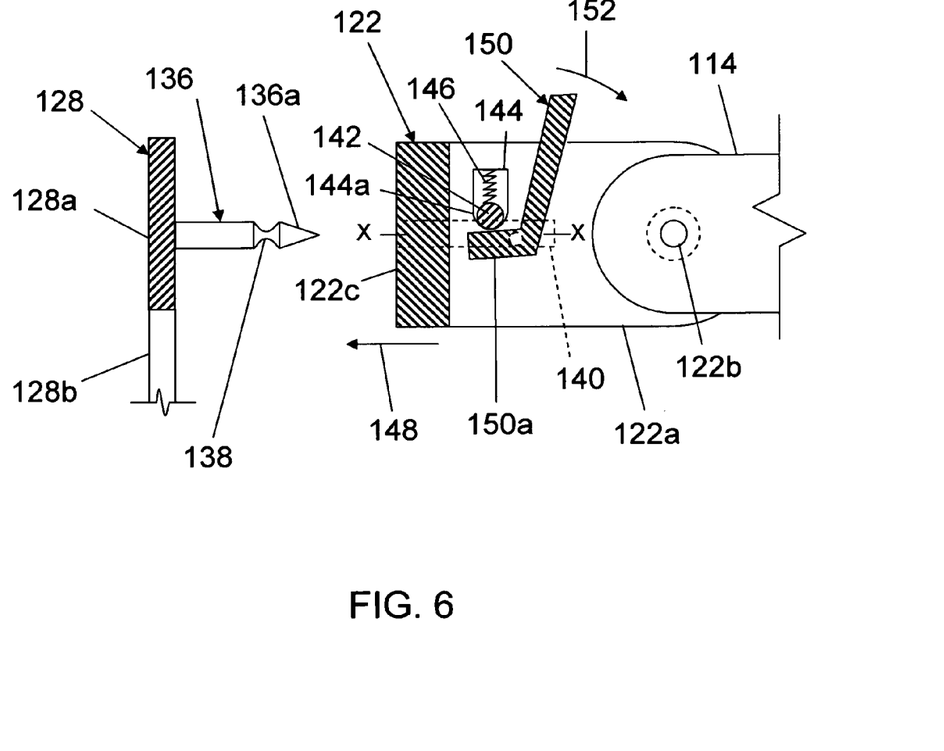
FIG. 6 is a cross-sectional view taken along line 6-6 of FIG. 5 showing the index bracket assembly and the clevis mechanism.

Referring also to FIG. 6, there is shown a cross-sectional view taken at line 6-6 of FIG. 5. For clarity, only a part of side portion 128b of frame 128 is shown and facemask 120 is not shown in FIG. 6. For the exemplary embodiment shown in FIGS. 5 and 6, bolt 122b secures clevis attachment 114 between appendages 122a. Spring-loaded bar 142 spans between appendages 122a, transverse to axis X-X of bores 140. Ends 142a of bar 142 are contained within slots 144 formed in appendages 122a parallel to bar 142. Slots 144 extend into appendages 122a to intersect bores 140, with base 144a of slots 144 being offset from axis X-X of bores 140. Spring 146 biases bar 142 against base 144a of slot 144, such that bar 142 partially extends into bores 140.

As clevis mechanism 122 is, moved toward frame 128 in the direction of arrow 148, pins 136 extend into bores 140 until frusto-conical ends 136a of pins 136 encounter bar 142. Further movement of clevis mechanism 122 toward frame 128 results in frusto-conical ends 136a displacing bar 142 from bores 140. Continuing to move clevis mechanism 122 toward frame 128 results in pins 136 further advancing into bores 140 until spring 146 biases bar 142 to engage with grooves 138 on pins 136 so as to secure clevis mechanism 122 to frame 128, with base 122c of clevis mechanism 122 being held against frame 128.

Lever 150 is rotatably attached between appendages 122a of clevis mechanism 122 so as to pivot about axis Y-Y, parallel to and offset from bar 142. When pivoted about axis Y-Y in a direction indicated by arrow 152, end 150a of lever 150 contacts bar 142 and works against the bias of spring 146 to lift bar 142 out of grooves 138 on pins 136. With bar 142 disengaged from grooves 138, clevis mechanism 122 can be moved away from frame 128 to retract pins 136 from bores 140 and disengage clevis mechanism 122 from frame 128.

What have thus been described are systems and methods for a facemask wearer to view high resolution, high data content, color imagery from a number of sensor devices. Display 100 has a waterproof housing (106). The housing materials and design can be chosen to provide specific depth ratings for the system, or to accommodate specific environmental conditions. Organic light emitting diode (OLED) matrix 108 provides 800×600 color pixel resolution at 60 Hz.

The low power usage of OLED matrix 108 allows the system to be powered through a standard Universal Serial Bus (USB) 102. Display 100 can be plugged into a compatible sensor system that provides the required power and standard display signal to display 100. A binocular embodiment includes lens arrays 118 preferably spaced at 62.5 mm to project a virtual image with a horizontal field of view (HFOV) of 32°.

Arrays 118 are configured to project images from OLED matrices 108 at an offset of 2°. The 2° offsets enable users with interpupillary distances of from 52 mm to 72 mm (approximately 93% of the population) to view and converge the images at lenses 112 without the need for a mechanical adjustment apparatus. A single, accessible brightness control 116 allows the user to adjust the system brightness for daylight, nighttime, or tactical situation operations from a single, readily accessible, central location.

Clevis attachment 114 on housing 106 and clevis mechanism 122 secure display 100 to a facemask index bracket assembly 124 while retaining the ability to remove display 100 quickly without dislodging or removing the mask. Index bracket assembly 124 provides a means to give facemask wearers an option for selectively connecting different displays 100 and other external apparatuses to a facemask. Therefore, index bracket assembly 124, as disclosed herein is not to be construed as limiting, but rather, is intended to be demonstrative of this inventive concept.

The quick release feature embodied in pins 136, bores 140, bar 142 and lever 150, allows an operator to put on or remove an apparatus with one hand and without removing his/her mask. Each apparatus can include clevis attachment 114 that can be pre-mounted on clevis mechanism 122, ready for operation, without requiring the cumbersome operation of unbolting the apparatus from clevis mechanism 122 during operational use.

Additionally, clips 130 provide for rigid attachment of index bracket 124 to the facemask. Clips 130 provide a significant improvement over securing the index frame with head straps, as in prior art index brackets. The head strap method can allow excessive movement of the apparatus relative to the dive mask, and in the case of critical alignment requirements, allows too much slop and movement for practical functionality.

Many modifications and variations of the present invention may become apparent in light of the above teachings. For example, the exact spacing of axes X-X and the 2° offsets of lens arrays 118 may vary depending on the placement of OLED matrices 108 and lens arrays 118 within housing 106. The combination of the spacing of axes X-X and the offsets of lens arrays 118 combine to provide a 32° (±1°) HFOV and to enable users with interpupillary distances of from 52 mm to 72 mm to converge and view the images at lenses 112 without the need for a mechanical adjustment apparatus.

Additionally, with some facemask configurations, bar 142 may be readily accessible to the user. With such configurations, the user can directly move bar 142 against the bias of spring 146, without the need for lever 150 to lift bar 142 out of grooves 138. Further, as described hereinbefore, the configuration of clips 130 and clevis mechanism 122 can be varied to suit the particular facemask and apparatuses to be used.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A display for a user of a facemask to view data from a sensor, the display comprising:
   two viewing lenses having centerline axes spaced apart a distance to provide a user with a horizontal field of view of between 31° and 33°;
   two organic light emitting diode matrices spaced a distance along said axes from said viewing lenses; and
   two lens arrays positioned along said axes between said viewing lenses and said matrices, said arrays having an offset from said axes to project images from said matrices onto said viewing lenses at an angle from said axes, said angle corresponding to an image convergence angle for over 90% of a user population.

2. The display of claim 1, further comprising a housing enclosing said matrices and said arrays and securing said viewing lenses, said housing protecting components of the display contained therein from environments surrounding said housing.

3. The display of claim 2, further comprising a Universal Serial Bus connector extending from said housing, said connector transmitting power and the data from the sensor to the display.

4. The display of claim 2, further comprising a control positioned on an exterior surface of said housing and accessible to said user, said control in communication with said matrices to control a brightness of said images.

5. The display of claim 2, further comprising:
   an index bracket assembly adapted to be attached to the facemask; and
   a clevis attachment attached to said housing and to said index bracket assembly.

6. The display of claim 5, wherein said index bracket assembly further comprises:
   a U-shaped frame having top and side portions consistent in shape with top and side rim portions of the facemask;
   at least one clip secured to said frame and removably compressing at least one of the top and side rim portions of the facemask between said frame and said at least one clip;
   at least two holding pins spaced apart and affixed to said frame, said pins extending orthogonally from said frame in a direction away from the facemask; and
   a clevis mechanism having bores formed therein, each of said pins being accepted into one of said bores and being releasably secured within said one bore, said clevis attachment being attached to said clevis mechanism.

7. The display of claim 6, wherein:
- each of said pins has a circumferential radiused groove at a distance from said frame; and
- ends of said pins distant from said frame are frusto-conically shaped.

8. The display of claim 7, wherein said clevis mechanism further comprises:
- a base portion housing said bores, said base portion being positioned adjacent said frame when said pins are secured within said bores; and
- appendages extending orthogonally from said base portion, said bores extending through said base portion into said appendages.

9. The display of claim 8, further comprising a movable retaining bar transverse to and spanning between said appendages and intersecting said bores in said appendages, said retaining bar being spring-biased to reside at least partially in said bores, said ends of said pins displacing said retaining bar from said bores, said bar engaging said groove in each of said pins to secure said clevis mechanism to said frame.

10. The display of claim 9, further comprising a lever pivotally attached between said appendages, a first end of said lever in contact with said bar, wherein pivoting said lever about an axis parallel to said bar disengages said bar from said grooves.

11. The assembly of claim 10, wherein said clevis mechanism further comprises an apparatus bolt removably extending through said appendages, said apparatus bolt securing said clevis attachment between said appendages.

12. The display of claim 1, wherein said centerline axes are spaced apart a distance of 62.5 millimeters.

13. The display of claim 12, wherein said offset is 2°.

14. The display of claim 2, wherein said housing is waterproof.

15. The display of claim 3, further comprising a waterproof seal where said connector enters said housing.

16. A display for a user of a facemask to view data from a sensor, the display comprising:
- two viewing lenses having centerline axes spaced apart a distance to provide a user with a horizontal field of view of between 31° and 33°;
- two organic light emitting diode matrices spaced a distance along said axes from said viewing lenses;
- two lens arrays positioned along said axes between said viewing lenses and said matrices, said arrays having an offset from said axes to project images from said matrices onto said viewing lenses at an angle from said axes, said angle corresponding to an image convergence angle for over 90% of a user population;
- a housing enclosing said matrices and said arrays and securing said viewing lenses, said housing protecting components of said display contained therein from environments surrounding said housing;
- a U-shaped frame having top and side portions consistent in shape with top and side rim portions of the facemask;
- at least one clip secured to said frame and removably compressing at least one of the top and side rim portions of the facemask between said frame and said at least one clip;
- at least two holding pins spaced apart and affixed to said frame, said pins extending orthogonally from said frame in a direction away from said facemask;
- a clevis attachment attached to said housing; and
- a clevis mechanism having bores formed therein, each of said pins being accepted into one of said bores and being releasably secured within said one bore, said clevis attachment being attached to said clevis mechanism.

17. The display of claim 16, wherein said centerline axes are spaced apart a distance of 62.5 millimeters.

18. The display of claim 17, wherein said offset is 2°.

19. The display of claim 16, further comprising a Universal Serial Bus connector extending from said housing, said connector transmitting power and the data from the sensor to the display.

20. The display of claim 19, further comprising a control positioned on an exterior surface of said housing and accessible to said user, said control in communication with said matrices to control a brightness of said images.

21. The display of claim 16 wherein said housing is waterproof.

22. The display of claim 19, further comprising a waterproof seal where said connector enters said housing.

* * * * *